US011932136B2

(12) United States Patent
Aschenbrenner et al.

(10) Patent No.: US 11,932,136 B2
(45) Date of Patent: Mar. 19, 2024

(54) MULTI-VOLTAGE BATTERY DEVICE AND ELECTRICAL SYSTEM FOR A MOTOR VEHICLE

(71) Applicant: Vitesco Technologies GmbH, Hannover (DE)

(72) Inventors: Tobias Aschenbrenner, Munich (DE); Stefan Lauer, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 603 days.

(21) Appl. No.: 17/257,636

(22) PCT Filed: Jul. 9, 2019

(86) PCT No.: PCT/EP2019/068451
§ 371 (c)(1),
(2) Date: Jan. 4, 2021

(87) PCT Pub. No.: WO2020/011806
PCT Pub. Date: Jan. 16, 2020

(65) Prior Publication Data
US 2021/0268935 A1    Sep. 2, 2021

(30) Foreign Application Priority Data

Jul. 12, 2018    (DE) ...................... 10 2018 211 582.6

(51) Int. Cl.
*B60L 58/20*    (2019.01)
*B60L 50/61*    (2019.01)
(Continued)

(52) U.S. Cl.
CPC ............... *B60L 58/20* (2019.02); *B60L 50/61* (2019.02); *B60L 53/22* (2019.02); *B60R 16/033* (2013.01);
(Continued)

(58) Field of Classification Search
CPC B60L 58/20; B60L 53/22; B60L 50/61; H02J 7/0024; H02J 7/00304;
(Continued)

(56) References Cited

U.S. PATENT DOCUMENTS 9,243,601 B2 * 1/2016 Reichow ............... H02J 7/1423
9,656,569 B2   5/2017 Takikita et al.
(Continued)

FOREIGN PATENT DOCUMENTS

CN    105471017 A    4/2016
CN    106585392 A    4/2017
(Continued)

OTHER PUBLICATIONS

European Notice of Allowance for European Application No. 19 739 259.0, dated Mar. 27, 2023 with partial translation, 40 pages.
(Continued)

*Primary Examiner* — Paul Dinh
(74) *Attorney, Agent, or Firm* — BUCHANAN, INGERSOLL & ROONEY PC

(57) ABSTRACT

A motor vehicle multi-voltage battery device, includes: a first electrical output terminal and an electrical ground terminal providing a first rated voltage; a second electrical output terminal and the electrical ground terminal providing a second rated voltage; a first series circuit having a first battery cell group and a first controllable switch between the first electrical output terminal and electrical ground terminal; a protective resistor parallel to the first switch. The first switch configured to bridge the protective resistor in a closed state; a second battery cell group between the second electrical output terminal and the first electrical output terminal connected switchably in series with the first battery
(Continued)

cell group; and a battery management assembly configured to switch the first switch into an open state to protect the first battery cell group.

12 Claims, 2 Drawing Sheets

(51) Int. Cl.
    *B60L 53/22* (2019.01)
    *B60R 16/033* (2006.01)
    *H01M 10/42* (2006.01)
    *H02H 9/02* (2006.01)
    *H02J 7/00* (2006.01)

(52) U.S. Cl.
    CPC .......... *H01M 10/425* (2013.01); *H02H 9/026* (2013.01); *H02J 7/0024* (2013.01); *H02J 7/00304* (2020.01); *H01M 2010/4271* (2013.01)

(58) Field of Classification Search
    CPC .............. B60R 16/033; H01M 10/425; H01M 2010/4271; H02H 9/026; Y02E 60/10; Y02T 10/62; Y02T 10/70; Y02T 10/7072; Y02T 90/14
    USPC ........................................................ 320/149
    See application file for complete search history.

(56) References Cited

U.S. PATENT DOCUMENTS

| | | | |
|---|---|---|---|
| 9,827,863 B2 | 11/2017 | Bartz et al. | |
| 2013/0162029 A1* | 6/2013 | Reichow | H02J 7/1423 307/10.1 |
| 2014/0070608 A1 | 3/2014 | Achhammer et al. | |
| 2018/0074108 A1* | 3/2018 | Dulle | H01M 10/48 |

FOREIGN PATENT DOCUMENTS

| | | |
|---|---|---|
| DE | 10258894 B3 | 1/2004 |
| DE | 10361743 A1 | 9/2004 |
| DE | 102012017674 A1 | 3/2014 |
| DE | 102014214984 A1 | 2/2016 |
| DE | 102015219589 A1 | 4/2017 |
| DE | 102015223546 A1 | 6/2017 |
| DE | 102016207033 A1 | 10/2017 |
| DE | 102016215559 A1 | 2/2018 |
| EP | 1777794 A2 | 4/2007 |
| EP | 2688179 A1 | 1/2014 |
| WO | 2013157289 A1 | 10/2013 |
| WO | 2018109001 A1 | 6/2018 |

OTHER PUBLICATIONS

Chinese Office Action for Chinese Application No. 201980046692.4, dated May 16, 2023 with partial translation, 7 pages.

International Search Report and Written Opinion for International Application No. PCT/EP2019/068451, dated Nov. 5, 2019, with partial English translation, 16 pages.

International Search Report and Written Opinion for International Application No. PCT/EP2019/068451, dated Nov. 5, 2019, 14 pages (German).

German Examination Report for German Application No. 10 2018 211 582.6, dated Jul. 17, 2019, 6 pages.

* cited by examiner

MULTI-VOLTAGE BATTERY DEVICE AND ELECTRICAL SYSTEM FOR A MOTOR VEHICLE

CROSS REFERENCE TO RELATED APPLICATIONS

This application is the U.S. National Phase application of PCT International Application No. PCT/EP2019/068451, filed Jul. 9, 2019, which claims priority to German Patent Application No. 10 2018 211 582.6, filed Jul. 12, 2018, the contents of such applications being incorpo-rated by reference herein.

FIELD OF THE INVENTION

The present invention relates to a multi-voltage battery device and an on-board electrical system for a motor vehicle, in particular for a hybrid electric or electric vehicle with a multi-voltage battery device.

BACKGROUND OF THE INVENTION

Multi-voltage battery devices for the provision of various rated or operating voltages for on-board electrical systems of motor vehicles, in particular hybrid electric or electric vehicles, are known.

As a result of various internal or external influences, on-board electrical systems are subject to the risk of increased (on-board electrical system) currents, in particular as a result of electrical short circuits in on-board electrical systems, whereby the multi-voltage battery devices are stressed, which can in turn lead to damage in battery cells of the multi-voltage battery devices.

In the multi-voltage battery devices with two or more battery cell groups, one of the battery cell groups remains electrically connected to the rest of the on-board electrical system in order to be able to continue to maintain the relevant functions, even during an idle mode in which the vehicle is switched off (after finishing driving operation), and only safety-relevant and other relevant functions of the vehicle are carried out. This battery cell group is therefore particularly at risk from excessive currents, in particular electrical short circuits, in the on-board electrical system.

SUMMARY OF THE INVENTION

An aim of the invention is thus that of providing a facility with which to protect the multi-voltage battery devices reliably, and thus also on-board electrical systems, from damage resulting from excessive (on-board electrical system) currents.

According to a first aspect of the invention, a multi-voltage battery device for a motor vehicle, in particular a hybrid electric or electric vehicle, is provided.

The multi-voltage battery device comprises a first electrical output terminal and an electrical ground terminal for the provision of a first rated voltage, for example a first on-board electrical system voltage, for an on-board electrical system of the motor vehicle.

The multi-voltage battery device further comprises a second electrical output terminal that serves, with the electrical ground terminal, for the provision of a second rated voltage, for example a second on-board electrical system voltage, for the on-board electrical system.

The multi-voltage battery device further comprises a first series circuit of a first battery cell group and a first controllable switch that is electrically connected between the first electrical output terminal and the electrical ground terminal. The first switch here is electrically connected through its two terminals into the first series circuit.

The multi-voltage battery device further comprises a protective resistor that is electrically connected between the two terminals of the first switch, and thus in parallel with the first switch. The first switch is configured to electrically short-circuit its two terminals when in a closed switch state, and thus to bridge the protective resistor.

The multi-voltage battery device additionally comprises a second battery cell group that is electrically connected between the second electrical output terminal and the first electrical output terminal, and is switchably connected in series with the first battery cell group.

The multi-voltage battery device further comprises a battery management assembly for operation of the multi-voltage battery device. The battery management assembly is configured to switch the first switch into an open switch state to protect the first battery cell group, and thus the multi-voltage battery device, from an overload resulting from an excessively high discharge current in the event of an excessively high current or of an electrical short circuit between the first electrical output terminal and the electrical ground terminal.

To protect the (first) battery cell group, and thus also the multi-voltage battery arrangement, from malfunctions resulting from excessively high currents or electrical short-circuits in the on-board electrical system, the multi-voltage battery device has been further developed in the context of an aspect of the invention, as described previously.

The first switch is provided here, and electrically connects the (first) battery cell group to the rest of the on-board electrical system optionally directly (when in a closed switch state) or via a protective resistor (when in the open switch state). The protective resistor serves as overcurrent protection, and limits the discharge current of the (first) battery cell group in the event of an excessively high current or of an electrical short-circuit in the on-board electrical system.

The control of the first switch is performed here by a battery management assembly that switches the first switch into the open switch state in the event of an excessively high current or of an electrical short-circuit in the on-board electrical system, and thus electrically connects the (first) battery cell group to the on-board electrical system via the protective resistor. As an overcurrent protection, the protective resistor then limits the discharge current of the (first) battery cell group, and thus protects it from overload resulting from an excessively high discharge current.

The excessively high current or the electrical short-circuit can, for example, be detected by a generally known current measuring unit connected to the on-board electrical system such as, for example, a Hall sensor, that is connected in a signal-technology sense to the battery management assembly and outputs an appropriate data signal to the battery management assembly in the presence of an excessively high current or of an electrical short-circuit.

In the event that an excessively high current is not flowing in the on-board electrical system, and thus an electrical short circuit is also not present, the battery management assembly switches the first switch into the closed switch state, and thus bridges the protective resistor. Unnecessary loss of power due to the protective resistor is thereby avoided.

A facility is thus provided with which a multi-voltage battery device, and therefore also an on-board electrical system, can be protected reliably against damage caused by excessively high (on-board electrical system) currents.

The multi-voltage battery device further for example comprises a second switch that is electrically connected between the two terminals of the first switch and in series with the protective resistor. The battery management assembly is here, for example, further configured to switch the second switch into a closed switch state in the event of the excessively high current or of the electrical short-circuit between the first electrical output terminal and the electrical ground terminal, and thus to enable a limited flow of current through the protective resistor.

The battery management assembly is, for example, further configured to switch the first switch into the open switch state and thus to limit the discharge current of the first battery cell group through the protective resistor in the event that the motor vehicle is in an idle state. The first battery cell group is thereby protected against possible overload due to an excessively high discharge current. If the previously described second switch is present, the battery management assembly is further configured to switch the second switch into the closed switch state and thereby to enable the limited flow of current through the protective resistor.

An idle mode of the motor vehicle is a state in which the motor vehicle is not in driving operation or in any other active operation. The motor vehicle changes into the idle mode when, for example, the vehicle drive is switched off and the ignition key is withdrawn from the ignition lock. As a rule, only safety-relevant and other comparable functions, which only demand a minimal supply of current, continue to be maintained in this idle mode.

The battery management assembly is, for example, further configured to switch the first and the second switches into the open switch state in the event of an internal malfunction or an internal electrical short-circuit in the first battery cell group. In this open switch state, the first and the second switches electrically disconnect the first battery cell group from the rest of the on-board electrical system. The on-board electrical system is consequently protected from possible damage resulting from an electrical short circuit in the first battery cell group.

The battery management assembly is, for example, further configured to switch the first and the second switches into the open switch state in the event of a critical charge state of the first battery cell group. The flow of current from the first battery cell group to the rest of the on-board electrical system is thereby interrupted, and the first battery cell group protected from a deep discharge.

The battery management assembly is electrically connected for example via the supply current terminals between the first electrical output terminal and the electrical ground terminal, and thus in parallel with the first series circuit. The battery management assembly is supplied with current via these supply current terminals.

The protective resistor is, for example, designed as a PTC resistor (positive temperature coefficient thermistor).

The multi-voltage battery device further for example comprises a unidirectional or bidirectional DC voltage converter that is electrically connected on the input voltage side between the first electrical output terminal and the first battery cell group and on the output voltage side between the second electrical output terminal and the second battery cell group. The DC voltage converter is configured to charge the second battery cell group with current of the first battery cell group and/or the first battery cell group with current of the second battery cell group, depending on requirement or on the charge states of the two battery cell groups. The battery management assembly is, for example, further configured (when required) to operate the DC voltage converter to charge the first battery cell group with the current of the second battery cell group and/or to charge the second battery cell group with the current of the first battery cell group.

The multi-voltage battery device further, for example, comprises a second series circuit of a third, controllable switch and the second battery cell group, that is electrically connected between the second electrical output terminal and the first electrical output terminal. The third switch here connects the second battery cell group to the first battery cell group in an electrically switchable manner.

The first and the second series circuits, for example, comprise a common circuit segment that electrically connects the first switch terminal to the first and the second battery cell groups. The first switch, or its two terminals, are then electrically connected in this common circuit segment.

The previously described first second and/or third switch are each, for example, implemented as a relay.

The critical charge state of the first and/or the second battery cell group lies, for example, below 30%, 20%, 15%, 10%, 8%, 5% or 3%. The critical charge state here depends, inter alia, in particular on the materials used or the cell chemistry, as well as on cell temperatures and other physical states of the battery cells of the first or of the second battery cell group.

The first rated voltage lies, for example, at 12 V and/or the second rated voltage at 48 V.

According to a further aspect of the invention, an on-board electrical system for a motor vehicle, in particular a hybrid electric or electric vehicle, is provided.

The on-board electrical system comprises a first on-board electrical system branch with a first on-board electrical system voltage and a second on-board electrical system branch with a second on-board electrical system voltage. The on-board electrical system further comprises a previously described multi-voltage battery device that is electrically connected via the first electrical output terminal (and the electrical ground terminal) to the first on-board electrical system branch and via the second electrical output terminal (and the electrical ground terminal) to the second on-board electrical system branch.

Advantageous configurations of the multi-voltage battery device described above are, insofar as they are transferable to the on-board electrical system mentioned above, also to be regarded as advantageous configurations of the on-board electrical system.

BRIEF DESCRIPTION OF THE DRAWINGS

Exemplary embodiments of the invention are explained in more detail below with reference to the appended drawings. Here.

DETAILED DESCRIPTION OF THE PREFERRED EMBODIMENTS

Figure 1:
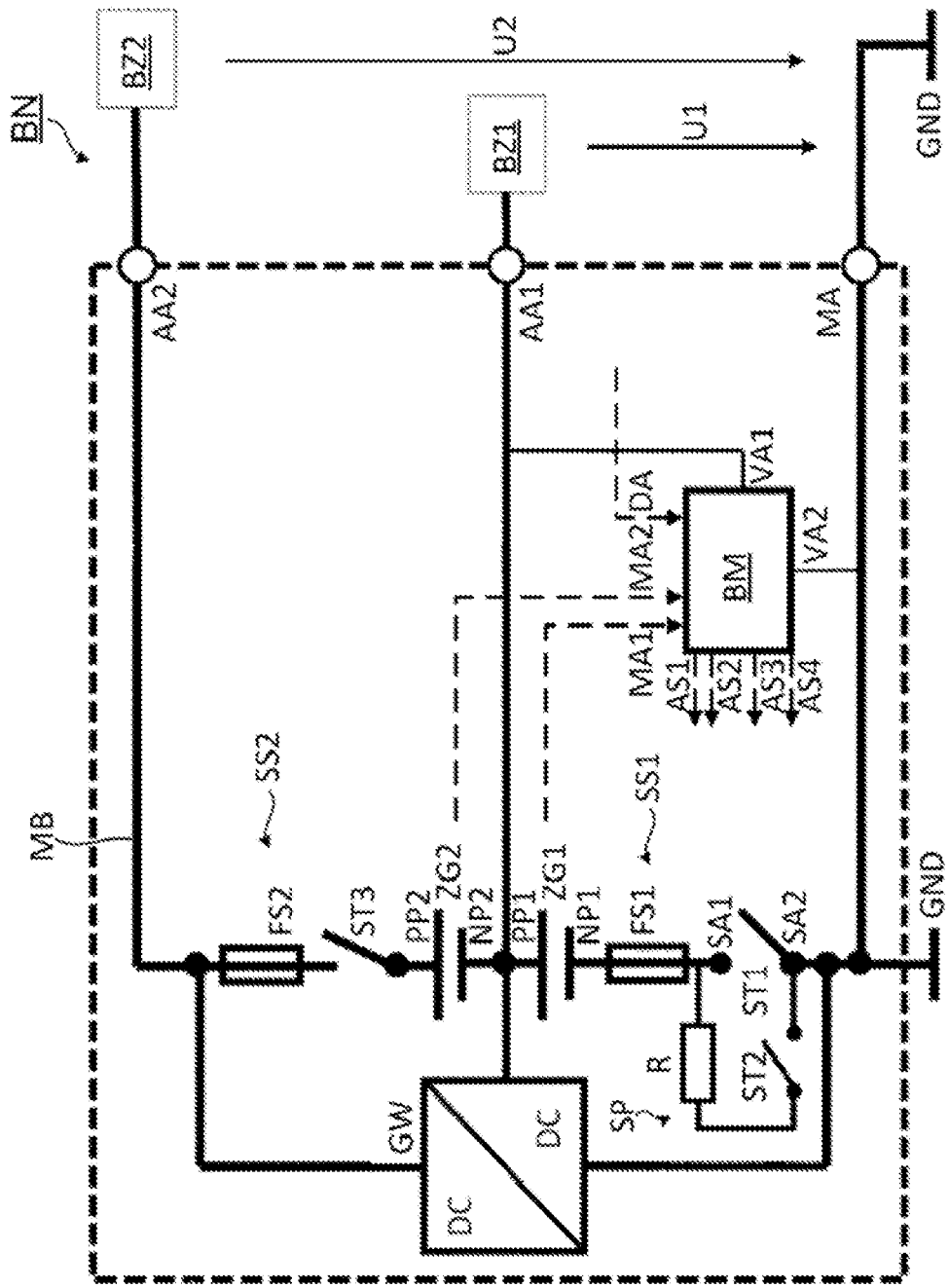
FIG. 1 shows a schematic illustration of an on-board electrical system of a hybrid electric vehicle with a multi-voltage battery device according to an exemplary embodiment of the invention.

The on-board electrical system BN in FIG. 1 comprises a first on-board electrical system branch BZ1 in which a first on-board electrical system voltage U1 with a level of, for example, 12 V, is present. The on-board electrical system BN further comprises a second on-board electrical system branch BZ2 in which a second on-board electrical system voltage U2 with a level of, for example, 48 V, is present. The on-board electrical system BN is, for example, installed in a hybrid electric vehicle with a 48 V mild hybrid drive.

The on-board electrical system BN also comprises a multi-voltage battery device MB for the provision or maintenance of the two on-board electrical system voltages U1, U2.

The multi-voltage battery device MB is constructed as what is known as an AES battery, that is a 48 V battery with a 12 V tap and a DC voltage converter GW.

The multi-voltage battery device MB comprises a first electrical output terminal AA1 and an electrical ground terminal MA at the electrical output side, via which the multi-voltage battery device MB is electrically connected to the first on-board electrical system branch BZ1. The multi-voltage battery device MB provides the first on-board electrical system voltage U1 that is present between the first electrical output terminal AA1 and the electrical ground terminal MA as a first rated voltage (or rated output voltage).

The multi-voltage battery device MB further comprises on the electrical output side a second electrical output terminal AA2, and is electrically connected via the second electrical output terminal AA2 and the electrical ground terminal MA to the second on-board electrical system branch BZ2. The multi-voltage battery device MB provides the second on-board electrical system voltage U2 that is present between the second electrical output terminal AA2 and the ground terminal MA as a second rated voltage (or rated output voltage).

The multi-voltage battery device MB comprises a first series circuit SS1 of a first battery cell group ZG1, a first safety fuse FS1 and a first controllable switch ST1, which is embodied as an appropriate, generally known, relay, between the first electrical output terminal AA1 and the electrical ground terminal MA. The first series circuit SS1 with the first battery cell group ZG1 thus forms a first current/voltage source for the first on-board electrical system branch BZ1. The first battery cell group ZG1 has a rated voltage with a level of 12 V, and thus provides the first on-board electrical system voltage U1. The first battery cell group ZG1 is here electrically connected via its positive pole PP1 to the first electrical output terminal AA1, and via its negative pole NP1 (and also via the first safety fuse FS1 and the first switch ST1) to the electrical ground terminal MA. The first switch ST1 comprises two terminals SA1, SA2 that are electrically connected together in series in the first series circuit SS1.

The multi-voltage battery device MB further comprises a current path SP between the two terminals SA1, SA2 of the first switch ST1 which thus extends parallel to the switch ST1. The current path SP comprises a protective resistor R and a second controllable switch ST2, that are electrically connected in series with one another. The protective resistor R is embodied here as a PTC resistor. The second switch ST2 is, like the first switch ST1, embodied as an appropriate, generally known, relay. In a closed switch state, the second switch ST2 enables the flow of current through the current path SP and via the protective resistor R. In an open switch state, the second switch ST2 interrupts the flow of current through the current path SP.

In a closed switch state, the first switch ST1 electrically shorts its two terminals SA1, SA2 to one another, and thus bridges the current path SP with the protective resistor R. In an open switch state, the first switch ST1 interrupts the direct flow of current between the two terminals SA1, SA2 and thus enables a flow of current via the current path SP and thus via the protective resistor R.

The multi-voltage battery device MB comprises a second series circuit SS2 of a second safety fuse FS2, a second battery cell group ZG2, and a third controllable switch ST3, which, like the two previously mentioned switches ST1, ST2, is embodied as an appropriate, generally known, relay, between the first electrical output terminal AA1 and the second electrical output terminal AA2. The second battery cell group ZG2 is electrically connected here via its positive pole PP2 (and further via the switch ST and the second safety fuse FS2) to the second electrical output terminal AA2 and via its negative pole NP2 to the first electrical output terminal AA1.

Between the second electrical output terminal AA2 and the ground terminal MA, the first and the second series circuits SS1, SS2 thus form a larger series circuit of the two battery cell groups ZG1, ZG2, the two safety fuses FS1, FS2, as well as the first and the third switches ST1, ST3, wherein the two battery cell groups ZG1, ZG2 are connected switchably in series with one another via the third switch ST3.

The second series circuit SS2 with the second battery cell group ZG2 forms, with the first series circuit with the first battery cell group ZG1 in series with a second current/voltage source for the second on-board electrical system branch BZ2. The second battery cell group ZG2 here has a rated voltage with a level of 36 V, and, with the first battery cell group ZG1 with the rated voltage of 12 V connected in series, provides the second on-board electrical system voltage U2 of 48 V.

The two battery cell groups ZG1, ZG2 are implemented here with lithium ion cells.

The multi-voltage battery device MB in addition comprises a bidirectional DC voltage converter GW that is electrically connected on the input voltage side between the first electrical output terminal AA1 and the first battery cell group ZG1, as well as on the output voltage side between the second electrical output terminal AA2 and the second battery cell group ZG2. The DC voltage converter GW is configured, when required, to charge the second battery cell group ZG2 with current of the first battery cell group ZG1 and/or the first battery cell group ZG1 with current of the first battery cell group ZG2.

The multi-voltage battery device MB also comprises a battery management assembly BM for operating, controlling or regulating the multi-voltage battery device MB. The battery management assembly BM is electrically connected via its supply current terminals VA1, VA2 between the first electrical output terminal AA1 and the electrical ground terminal MA, and thus in parallel with the first series circuit SS1. The battery management assembly BM is thus supplied with electricity from the first battery cell group ZG1 (provided the first and the second switches ST1, ST2 are in the closed switch state).

The battery management assembly BM is connected for measurement on the signal input side via two measurement signal terminals MA1, MA2 to the two battery cell groups ZG1, ZG2, and monitors the cell voltages, the charge levels (state of charge, SoC), the aging levels (state of health, SoH) and other properties such as, for example, the cell temperatures, of the two battery cell groups ZG1, ZG2 in a manner known to the expert via these measurement signal terminals MA1, MA2. The battery management assembly BM is further connected for signaling on the signal input side through a data signal terminal DA to an external current measuring unit in the first on-board electrical system branch BZ1. In a manner known to the expert, the current measuring unit detects excessively high on-board electrical system currents or electrical short circuits in the first on-board electrical system branch BZ1, and provides information regarding excessive on-board electrical system currents or electrical short circuits in the first on-board electrical system branch BZ1 to the battery management assembly BM.

On the signal output side, the battery management assembly BM is connected for signaling to the DC voltage converter GW and to the three switches ST1, ST2, ST3 via four control signal terminals AS1, AS2, AS3, AS4, or to respective control signal terminals of these four circuit components, and controls or regulates these circuit components.

The battery management assembly BM is configured, in a manner known to the expert, to monitor charge states of the two battery cell groups ZG1, ZG2 and, in the event of critical charge states of the respective battery cell groups ZG1, ZG2, to control or regulate the DC voltage converter GW and the three switches ST1, ST2, ST3 in such a way that the two battery cell groups ZG1, ZG2 are each charged with current from the respective other battery cell group ZG1, ZG2 and are thus protected from damage resulting from deep discharge.

In the event that it learns from the current measuring unit about an excessive on-board electrical system current or an electrical short circuit in the first on-board electrical system branch BZ1, the battery management assembly BM is further configured to switch the first switch ST1 into the open switch state and at the same time to switch the second switch ST2 into the closed switch state, whereby the electrical connection between the first battery cell group ZG1 and the first on-board electrical system branch BZ1 passes through the protective resistor R. The protective resistor R limits the discharge current of the first battery cell group ZG1 and thus protects the first battery cell group ZG1 from overload. The resistance value of the protective resistor R (designed as a PTC resistor) now rises with the rising value of the discharge current through the first series circuit SS1 as a result of the temperature at the protective resistor R rising with the rising value of the current. The current-limiting effect of the protective resistor R thus also rises with the rising current value of the discharge current.

In addition to this, the battery management assembly BM monitors internal malfunctions, such as for example internal electrical short circuits, in the battery cells of the first battery cell group ZG1 on the basis of the measured cell voltages and/or cell temperatures. In the presence of an internal malfunction, the battery management assembly BM switches the first and the second switches ST1, ST2 into the open switch state. The electrical connection between the first battery cell group ZG1 and the first on-board electrical system branch BZ1 is thereby interrupted.

If the motor vehicle is parked following a driving operation and goes into idle mode, only safety-relevant and other relevant functions of the vehicle continue to be carried out. Electrical systems or components such as, for example, sensors, bus systems and control devices that carry out these relevant functions accordingly continue to consume current.

As a rule, these systems or components have a rated voltage of 12 V (12 V consumers), and are therefore connected to the first on-board electrical system BZ1, and are consequently supplied with current by the first battery cell group ZG1—including when the vehicle is in idle mode.

In order to be able to maintain the electrical supply over the longest possible time duration, or to avoid a deep discharge in the battery cells of the first battery cell group ZG1, the current consumption during the idle mode should be kept as low as possible.

For this purpose the battery management assembly BM switches the first switch ST1 into the open switch state and at the same time the second switch ST2 into the closed switch state, and does this independently of whether an excessive on-board electrical system current or an electrical short-circuit is present in the first on-board electrical system branch BZ1, and thus preventively protects the first battery cell group ZG1 over the full duration of the idle mode against excessive discharge currents.

In this case it is no longer necessary for the battery management assembly BM to monitor the value of the current in the first on-board electrical system branch BZ1 during the idle mode. This reduces the current requirement of the battery management assembly BM, whereby again less current is drawn from the first battery cell group ZG1.

The loss of current at the protective resistor R is comparatively low as a result of the discharge current of the first battery cell group ZG1 being in itself low and the fact that at low discharge current, and thus at a low component temperature, the protective resistor R, as a PTC resistor, has a low resistance value.

Figure 2:
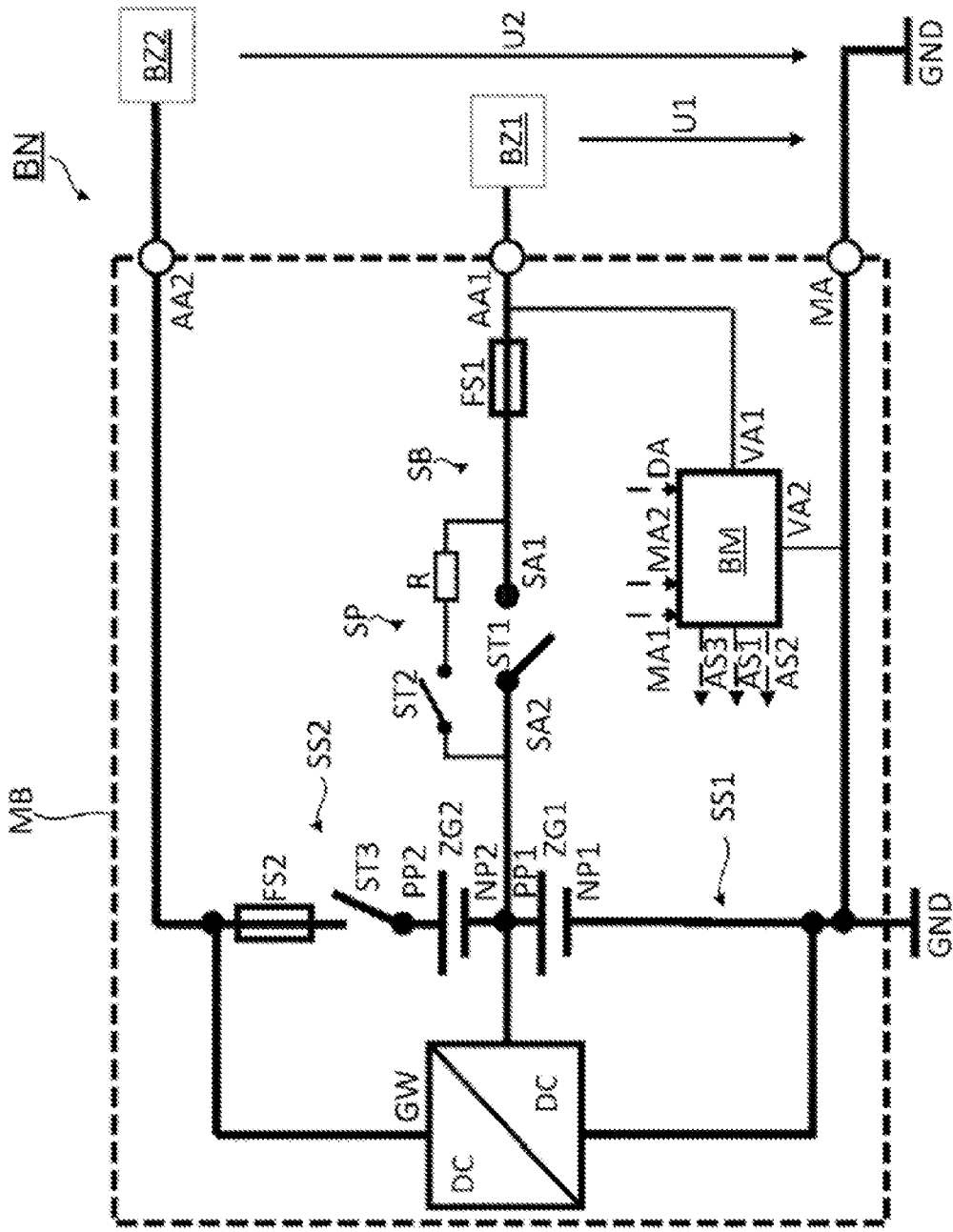
FIG. 2 shows a further schematic illustration of a further on-board electrical system of a hybrid electric vehicle with a further multi-voltage battery device according to a further exemplary embodiment of the invention.

The on-board electrical system BN in FIG. 2 differs from the on-board electrical system illustrated in FIG. 1 in that the first safety fuse FS1 and the first switch ST1, as well as the current path SP with the protective resistor R and the second switch ST2, are not electrically connected between the first battery cell group ZG1 and the electrical ground terminal MA, but between the first electrical output terminal AA1 on the one hand and the first and the second battery cell group ZG1, ZG2 on the other hand. The first safety fuse FS1, the first switch ST1 and the current path SP with the protective resistor R and the second switch ST2 are thus electrically connected in a common circuit segment SB of the first and the second series circuit SS1, SS2, that electrically connects the first electrical output terminal AA1 to the first and the second battery cell group ZG1, ZG2.

The first switch ST1 is now electrically connected via its two terminals SA1, SA2 in the common circuit segment SB. The current path SP with the protective resistor R and the second switch ST2 is then electrically connected between the two terminals SA1, SA2 of the first switch ST1, and parallel to the first switch ST1.

The invention claimed is:

1. A multi-voltage battery device for a motor vehicle, comprising:
   a first electrical output terminal and an electrical ground terminal for the provision of a first rated voltage;
   a second electrical output terminal and the electrical ground terminal for the provision of a second rated voltage;
   a first series circuit of a first battery cell group and a first controllable switch between the first electrical output terminal and the electrical ground terminal, wherein the first switch is electrically connected into the first series circuit via two terminals;
   a first protective resistor that is electrically connected between the two terminals of the first switch, the first protective resistor being connected in parallel to the first switch;
   wherein the first switch is configured to bridge the protective resistor when in a closed switch state;
   a second battery cell group, that is electrically connected between the second electrical output terminal and the first electrical output terminal, and is connected switchably in series with the first battery cell group;

a battery management assembly for operating the multi-voltage battery device, the battery management assembly being configured to switch the first switch into an open switch state to protect the first battery cell group in the event of an excessively high current or of an electrical short-circuit between the first electrical output terminal and the electrical ground terminal.

2. The multi-voltage battery device as claimed in claim 1, further comprising:
   a second switch that is electrically connected between the two terminals of the first switch, and in series with the protective resistor;
   wherein the battery management assembly is further configured to switch the second switch into a closed switch state in the event of the excessively high current or of the electrical short-circuit between the first electrical output terminal and the electrical ground terminal.

3. The multi-voltage battery device as claimed in claim 2, wherein the battery management assembly is further configured to switch the first switch into the open switch state and to switch the second switch into the closed switch state in the event that the motor vehicle is in an idle mode.

4. The multi-voltage battery device as claimed in claim 2, wherein the battery management assembly is further configured to switch the first and the second switches into the open switch state in the event of an internal malfunction or an internal electrical short-circuit in the first battery cell group.

5. The multi-voltage battery device as claimed in claim 2, wherein the battery management assembly is further configured to switch the first and the second switches into the open switch state in the event of a critical charge state of the first battery cell group.

6. The multi-voltage battery device as claimed in claim 1, wherein the battery management assembly is electrically connected via electrical supply connections between the first electrical output terminal and the electrical ground terminal, and parallel to the first series circuit.

7. The multi-voltage battery device as claimed in claim 1, wherein the protective resistor is implemented as a PTC resistor.

8. The multi-voltage battery device as claimed in claim 1, further comprising:
   a unidirectional or bidirectional DC voltage converter that is electrically connected on the input voltage side between the first electrical output terminal and the first battery cell group and on the output voltage side between the second electrical output terminal and the second battery cell group, and which is configured to charge the second battery cell group with current of the first battery cell group and/or the first battery cell group with current of the first battery cell group;
   wherein the battery management assembly is further configured to operate the DC voltage converter to charge the first battery cell group with the current of the second battery cell group and/or to charge the second battery cell group with the current of the first battery cell group.

9. The multi-voltage battery device as claimed in claim 1, further comprising:
   a second series circuit consisting of a third controllable switch and the second battery cell group between the second electrical output terminal and the first electrical output terminal;
   wherein the third switch here connects the second battery cell group to the first battery cell group in an electrically switchable manner.

10. The multi-voltage battery device as claimed in claim 9,
    wherein the first and the second series circuits comprise a common circuit segment that electrically connects the first electrical output terminal to the first and the second battery cell groups;
    wherein the first switch, or its two terminals are electrically connected into the circuit segment.

11. An on-board electrical system for a motor vehicle, comprising:
    a first on-board electrical system branch with a first on-board electrical system voltage;
    a second on-board electrical system branch with a second on-board electrical system voltage;
    a multi-voltage battery device as claimed in claim 1, that is electrically connected via the first electrical output terminal to the first on-board electrical system branch and via the second electrical output terminal to the second on-board electrical system branch.

12. The multi-voltage battery device as claimed in claim 3, wherein the battery management assembly is further configured to switch the first and the second switches into the open switch state in the event of an internal malfunction or an internal electrical short-circuit in the first battery cell group.

* * * * *